(12) United States Patent
Wang et al.

(10) Patent No.: US 11,646,488 B2
(45) Date of Patent: May 9, 2023

(54) LIQUID CRYSTAL PHASE SHIFTER HAVING A DELAY LINE WITH LINE SPACING AND/OR LINE WIDTH THAT PROVIDES A SPECIFIED CELL THICKNESS AND AN ANTENNA FORMED THEREFROM

(71) Applicant: BOE TECHNOLOGY GROUP CO., LTD., Beijing (CN)

(72) Inventors: Xiyuan Wang, Beijing (CN); Yali Wang, Beijing (CN); Dongdong Zhang, Beijing (CN); Feng Qu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 191 days.

(21) Appl. No.: 17/259,163

(22) PCT Filed: Mar. 27, 2020

(86) PCT No.: PCT/CN2020/081566
§ 371 (c)(1),
(2) Date: Jan. 9, 2021

(87) PCT Pub. No.: WO2021/189397
PCT Pub. Date: Sep. 30, 2021

(65) Prior Publication Data
US 2022/0140457 A1 May 5, 2022

(51) Int. Cl.
*H01Q 3/36* (2006.01)
*H01P 1/18* (2006.01)
(Continued)

(52) U.S. Cl.
CPC ............. *H01Q 3/36* (2013.01); *G02F 1/1306* (2013.01); *H01P 1/18* (2013.01); *H01P 1/181* (2013.01); *H01P 1/184* (2013.01); *H01P 11/00* (2013.01)

(58) Field of Classification Search
CPC .. H01P 1/181; H01P 1/184; H01P 1/18; H01P 9/00; H01Q 3/36
(Continued)

(56) References Cited

U.S. PATENT DOCUMENTS

| 4,116,544 A | 9/1978 | Soref | |
|---|---|---|---|
| 2020/0266511 A1* | 8/2020 | Kong et al. | H01P 1/18 |
| 2021/0367314 A1* | 11/2021 | Hu et al. | H01P 1/18 |

FOREIGN PATENT DOCUMENTS

| CN | 108519701 A | 9/2018 |
|---|---|---|
| CN | 108563050 A | 9/2018 |

(Continued)

*Primary Examiner* — Benny T Lee
(74) *Attorney, Agent, or Firm* — Houtteman Law LLC (57) ABSTRACT

The present disclosure provides a phase shifter and a manufacturing method thereof, and an antenna. The phase shifter includes a first substrate and a second substrate, and a medium layer arranged between them. The first substrate includes a reference electrode arranged on a side of a first base substrate close to the medium layer, and the second substrate includes a delay line arranged on a side of a second base substrate close to the medium layer. An orthographic projection on the first substrate of the delay line at least partially overlaps with that of the reference electrode. A line spacing and/or a line width of the delay line is enable to make a cell thickness between the first substrate and the second substrate be 20 µm-75 µm.

20 Claims, 4 Drawing Sheets

(51) Int. Cl.
*G02F 1/13* (2006.01)
*H01P 11/00* (2006.01)

(58) Field of Classification Search
USPC .......................................................... 333/161
See application file for complete search history.

(56) References Cited

FOREIGN PATENT DOCUMENTS

| | | |
|---|---|---|
| CN | 109164608 A | 1/2019 |
| KR | 20020018935 A | 3/2002 |

\* cited by examiner

LIQUID CRYSTAL PHASE SHIFTER HAVING A DELAY LINE WITH LINE SPACING AND/OR LINE WIDTH THAT PROVIDES A SPECIFIED CELL THICKNESS AND AN ANTENNA FORMED THEREFROM

CROSS-REFERENCE OF RELATED APPLICATIONS

The present application is a US National Stage of International Application No. PCT/CN2020/081566, filed on Mar. 27, 2020, which is hereby incorporated by reference in its entirety.

TECHNICAL FIELD

The present disclosure relates to the field of communication technology, more particularly, to a phase shifter and a manufacturing method thereof, and an antenna.

BACKGROUND

A phase shifter is a device used for changing a phase of an electromagnetic wave signal. The ideal phase shifter has a very small insertion loss, and almost the same loss in different phase states, so as to achieve a balance of amplitude. There are several types of phase shifter such as electric control, light control, magnetic control, and mechanical control. The phase shifter, whose basic function is to change a transmission phase of a microwave signal by controlling a bias voltage, is divided into a digital phase shifter and an analog phase shifter (whose phase shift adjustment is continuous). The digital phase shifter is an important part of a phased array antenna, and is used for controlling a phase of each signal in the antenna array, allowing the radiation beam to be scanned electrically. The digital phase shifter is also commonly used in a digital communication system as a phase modulator.

SUMMARY OF THE INVENTION

The present disclosure aims to solve at least one of the technical problems existing in the prior art, and provides a phase shifter and a manufacturing method thereof, and an antenna.

In a first aspect, embodiments of the present disclosure provide a phase shifter, including: a first substrate and a second substrate arranged opposite each other, and a medium layer arranged between the first substrate and the second substrate; the first substrate including: a first base substrate, and a reference electrode arranged on a side of the first base substrate facing the medium layer; and the second substrate including: a second base substrate, and a delay line arranged on a side of the second base substrate facing the medium layer, and an orthographic projection of the delay line on the first base substrate at least partially overlapping with the reference electrode on the first base substrate; wherein a line spacing and/or a line width of the delay line is enable to make a cell thickness between the first substrate and the second substrate be 20 μm-75 μm.

Optionally, the line spacing of the delay line is 100 μm-350 μm.

The line width of the delay line is 40 μm-90 μm.

Optionally, the line width of the delay line is 79 μm.

Optionally, the cell thickness between the first substrate and the second substrate is 40 μm.

Optionally, the side of the second base substrate facing the medium layer is further provided with a bias line; and the bias line is coupled with the delay line.

Optionally, the bias line has a line width of 2 μm-8 μm.

Optionally, the bias line is made of any one of indium tin oxide, nickel, tantalum nitride, chromium, indium oxide, and tin oxide.

Optionally, the delay line is any one of a shape of the Chinese character "コ", a shape of the Chinese character "回", and a serpentine shape.

Optionally, the delay line is made of any one or more of aluminum, silver, gold, chromium, molybdenum, nickel, and iron.

Optionally, the reference electrode includes a planar electrode, and the planar electrode is provided with at least one opening.

Optionally, the first substrate further includes a first alignment layer arranged on a side of the reference electrode facing the medium layer; and the second substrate further includes a second alignment layer arranged on a side of the delay line facing the medium layer.

Optionally, the phase shifter further includes a supporting pillar located between the first substrate and the second substrate for maintaining the cell thickness between the first substrate and the second substrate, and frame sealing glue for sealing the first substrate and the second substrate.

Optionally, the reference electrode includes a ground electrode.

Optionally, the medium layer includes a liquid crystal layer.

In a second aspect, embodiments of the present disclosure provide a manufacturing method for a phase shifter including forming a first substrate and a second substrate, and forming a medium layer between the first substrate and the second substrate; wherein forming the first substrate includes: forming a pattern including a reference electrode on a first base substrate; forming the second substrate includes: forming a pattern including a delay line on a second base substrate; and a line spacing and/or a line width of the delay line is enable to make a cell thickness between the first substrate and the second substrate be 20 μm-75 μm.

In a third aspect, embodiments of the present disclosure provide an antenna including the above-mentioned phase shifter.

Optionally, the reference electrode is provided with an opening, the antenna further includes a patch electrode arranged on a side of the first base substrate away from the liquid crystal layer, and the patch electrode is arranged to correspond to a position of the opening of the reference electrode.

DETAILED DESCRIPTION OF THE INVENTION

To make those skilled in the art better understand the technical solutions of the present disclosure, the present disclosure will be further described in detail below in conjunction with the accompanying drawings and embodiments.

Unless otherwise defined, the technical terms or scientific terms used in the present disclosure shall have the usual meanings understood by those with ordinary skills in the field to which this disclosure belongs. The "first", "second" and other similar words used in the present disclosure do not indicate any order, quantity, or importance, but are only used to distinguish different components. Similarly, the "a", "one", "the" or another similar word does not mean quantity limitation, but means that there is at least one. The "include", "comprise" or another similar word means that an element or item appearing in front of the word encompasses an element or item listed behind the word, and its equivalents, but does not exclude other elements or items. The "connected to", "coupled to" or other similar words are not limited to physical or mechanical connections, but may include electrical connections, whether directly or indirectly. The "upper", "lower", "left", "right", etc. are only used to indicate relative position relationships. When an absolute position of a described object changes, a relative position relationship may also change accordingly.

The same reference numerals or the same reference designators denote the same elements throughout the specification.

Figure 1:
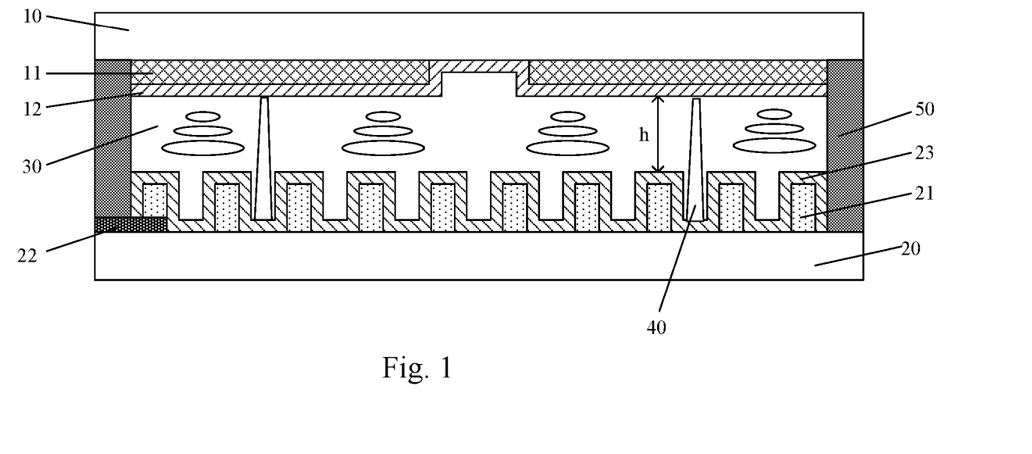
FIG. 1 is a schematic structural diagram of a phase shifter.
Figure 2:
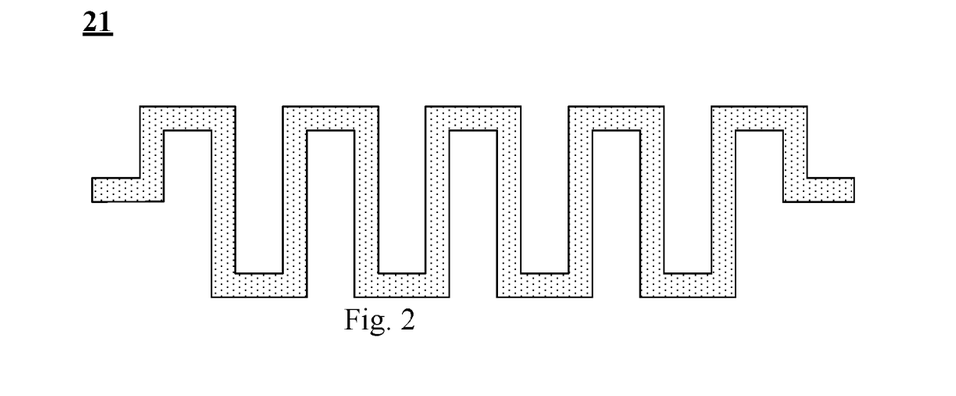
FIG. 2 is a top view of a structure of a second substrate of a phase shifter.

FIG. 1 illustrates a structure of a phase shifter, and FIG. 2 illustrates a top view of a structure of a delay line 21 in the phase shifter shown in FIG. 1. As shown in FIG. 1, the phase shifter includes a first substrate and a second substrate arranged opposite each other, and a liquid crystal layer 30 arranged between the first substrate and the second substrate. The first substrate includes a first base substrate 10, and a ground electrode 11 arranged on a side of the first base substrate 10 facing the liquid crystal layer 30, and a first alignment layer 12 arranged on a side of the ground electrode 11 facing the liquid crystal layer 30. The second substrate includes a second base substrate 20, a delay line 21 and a bias signal lead-in line 22 which are arranged on a side of the second base substrate 20 facing the liquid crystal layer 30, and a second alignment layer 23 arranged on a side of the delay line 21 and the bias signal lead-in line 22 facing the liquid crystal layer 30. An orthographic projection of the delay line 21 on the first base substrate 10 at least partially overlaps with the ground electrode 11 on the first base substrate 10. When the bias signal lead-in line 22 introduces a direct current (DC) bias voltage to the delay line 21, a DC bias electric field will be formed between the delay line 21 and the ground electrode 11, and thus an axial deflection will occur in the liquid crystal molecules of the liquid crystal layer 30, thereby changing a relative dielectric constant of the liquid crystal layer 30. A microwave signal travels along the delay line 21 and propagates between the ground electrode 11 and the delay line 21. As the relative dielectric constant of the liquid crystal layer 30 changes at this time, a phase of the microwave signal changes.

Of course, as shown in FIG. 1, the phase shifter not only includes the above components, but also includes other components, such as a supporting pillar 40 for maintaining a thickness of the liquid crystal cell (i.e., a cell thickness between the first substrate and the second substrate), and frame sealing glue 50 for sealing the liquid crystal cell, which will not be described one by one here.

The inventor has discovered that a deflection time of the liquid crystal molecules in the liquid crystal layer under the DC bias electric field is determined by $t_{on}$ and $t_{off}$. $t_{on}$ is a time period from the start of applying the DC bias electric field, to the completion of arrangements of the liquid crystal molecules in a direction of the electric field. $t_{off}$ is a time period during which the liquid crystal molecules rotate to a state of lowest free energy from the start of arrangements of the liquid crystal molecules in the direction of the electric field, after removing the DC bias electric field. $t_{on} \propto \sigma h^2/[\varepsilon_0 \Delta \varepsilon_r (V^2 - V_{th}^2)]$, and $t_{off} \propto Y h^2/(\varepsilon_0 \Delta \varepsilon_r V_{th}^2)$, wherein Y represents a viscosity of a liquid crystal molecular material, h is the thickness of the liquid crystal cell (i.e., the cell thickness between the first substrate and the second substrate), $\varepsilon_0$ represents a vacuum dielectric constant, $\Delta \varepsilon_r$ represents a difference between a relative dielectric constant of the liquid crystal molecules in the parallel state and that of the liquid crystal molecules in the vertical state, V represents the DC bias voltage applied to the liquid crystal layer, and $V_{th}$ represents a DC bias voltage value which makes the DC bias electric field reach an intensity that makes the liquid crystal molecules start to rotate. Both $t_{on}$ and $t_{off}$ are proportional to the square of the thickness of the liquid crystal cell; that is, a response time of the phase shifter is proportional to the square of a thickness of the liquid crystal layer. In the related art, the thickness of the liquid crystal cell is generally 100 μm-200 μm, and the larger thickness of the liquid crystal cell causes a very long response time of the phase shifter, which is an order of several seconds. However, if the thickness of the liquid crystal cell is only reduced, several defects will be brought such as mismatched phase shifter impedance, enhanced reflection, increased loss, and increased mutual coupling between adjacent delay lines 21. Therefore, it is an urgent technical problem to provide a phase shifter which can effectively reduce the thickness of the liquid crystal cell and avoid the above-mentioned defects. Therefore, the following technical solution is provided in the embodiments of the present disclosure.

Before describing the following embodiments, it should be noted that a medium layer in the phase shifter provided in the following embodiments includes, but is not limited to, the liquid crystal layer 30, and it will be described only by taking the medium layer be the liquid crystal layer 30 as an example. A reference electrode in the phase shifter includes, but is not limited to, the ground electrode 11, as long as the reference electrode can form a current loop with the delay line 21. In the embodiments of the present disclosure, it will be described only by taking the reference electrode be the ground electrode 11 as an example.

Figure 3:
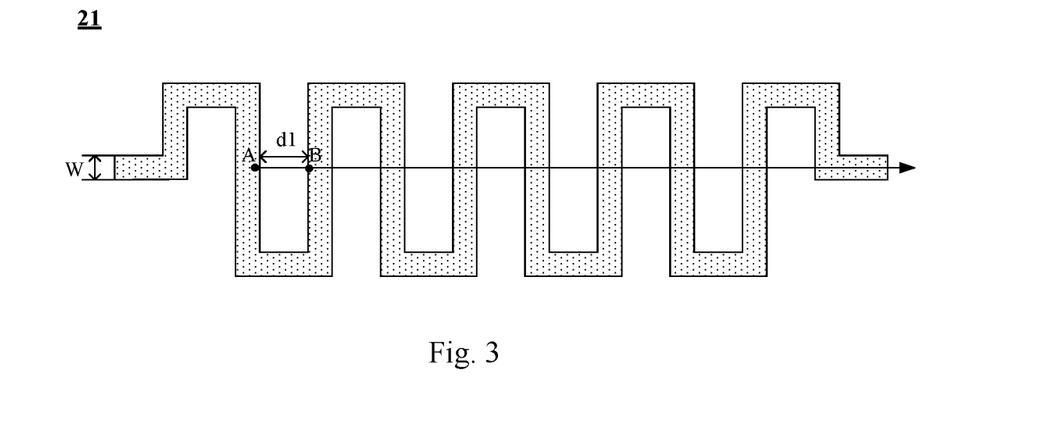
FIG. 3 is a top view of a "コ"-shaped delay line of a phase shifter according to an embodiment of the present disclosure.

In the first aspect, the embodiments of the present disclosure provide a phase shifter, which is the same structure as the phase shifter shown in FIGS. 1 and 2. The phase shifter also includes the first substrate and the second substrate arranged opposite each other, and the liquid crystal layer 30 arranged between the first substrate and the second substrate. The first substrate includes the first base substrate 10, and the ground electrode 11 arranged on the side of the first base substrate 10 facing the liquid crystal layer 30. The second substrate includes the second base substrate 20, and the delay line 21 arranged on the side of the second base substrate 20 facing the liquid crystal layer 30, and the orthographic projection of the delay line 21 on the first base substrate 10 only partially overlaps with the ground electrode 11 on the first base substrate 10. When the delay line 21 is applied with a DC bias voltage and generates an electric field with the ground electrode 11, the liquid crystal molecules of the liquid crystal layer 30 are deflected, and thus the phase of a microwave signal is shifted. In particular, in the embodiments of the present disclosure, by means of setting a line spacing and/or a line width of the delay line 21, a cell thickness h between the first substrate and the second substrate is ensured to be 20 μm-75 μm. The line spacing of the delay line 21 refers to a shortest distance between two parts of the delay line 21 extending in a same direction. As shown in FIG. 3, points A and B are two points on the delay line 21 adjacent to each other in a direction of a normal line (also called a normal direction), i.e., the point A is on the delay line 21 and the normal line, which is perpendicular to the delay line 21 and intersects the delay line 21 at the point A, has intersection points with other parts of the delay line 21, and the point B is the one point closest to the point A among the intersection points; and the line spacing of the delay line 21 is the distance between the points A and B.

According to electromagnetic simulation experiments, reasonable setting of the line width W (shown in FIG. 3) and line spacing of the conductive delay line 21 can make the phase shifter in a working status that impedance matching, less reflection, less loss, and reduced mutual coupling between various parts of the delay line 21 are implemented. Herein, the cell thickness h between the first substrate and the second substrate (i.e., the thickness of the liquid crystal layer) may be set to 20 μm-75 μm, so that a response speed of the phase shifter can be improved.

In some embodiments, the delay line 21 may be any one of a shape of the Chinese character "弓" (FIG. 3), a shape of the Chinese character "回" (FIG. 4), a serpentine shape (not shown), and a combination thereof. In order to define the line spacing in the embodiments of the present disclosure more clearly, in the following, a "弓"-shaped delay line and a "回"-shaped delay line are respectively described as examples.

As shown in FIG. 3, the delay line 21 has the shape of the Chinese character "弓" Point A is on the "弓"-shaped delay line, a normal line has intersection points with other parts of the delay line 21, the one point closest to the point A among the intersection points is point B, a distance between the point A and the point B is d1, and distance d1 is the line spacing of the "弓"-shaped delay line 21.

Figure 4:
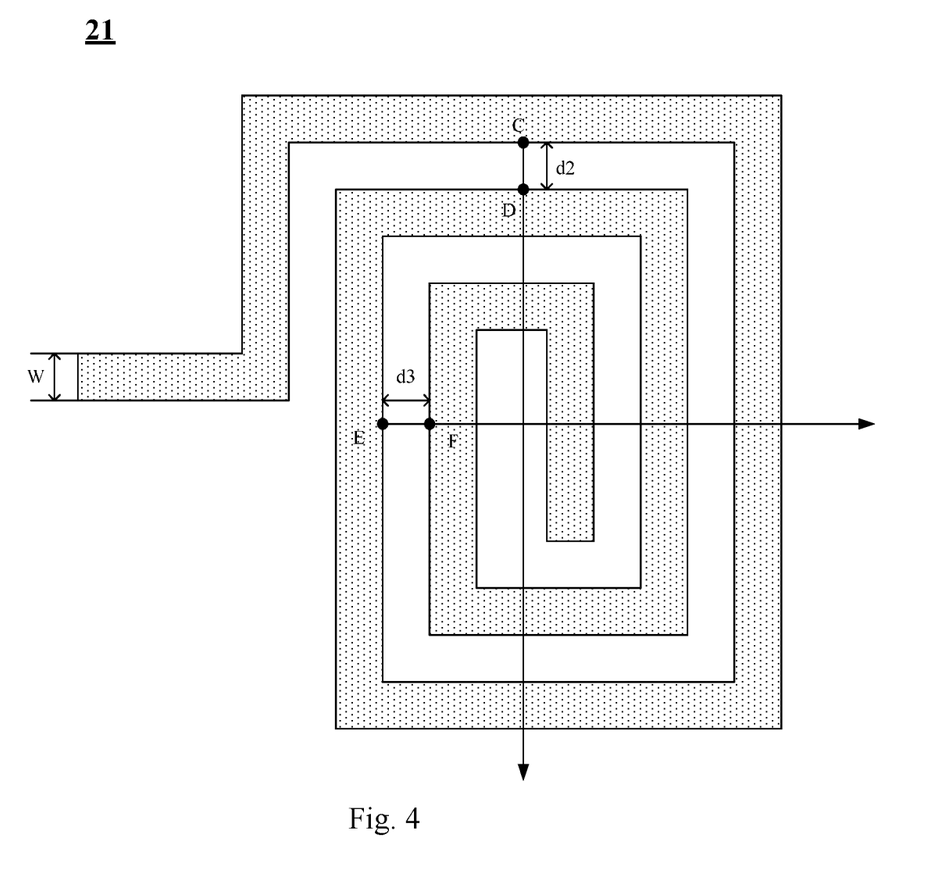
FIG. 4 is a top view of a "回"-shaped delay line of a phase shifter according to an embodiment of the present disclosure.

As shown in FIG. 4, the delay line 21 has the shape of the Chinese character "回". Point C is on the "回"-shaped delay line, a normal line has intersection points with other parts of the delay line 21, and the one point closest to the point C among the intersection points is point D. Point E is on the "回"-shaped delay line, another normal line has intersection points with other parts of the delay line 21, and the one point closest to the point E among the intersection points is point F. A distance between the point C and the point D is d2, a distance between the point E and the point F is d3, and distances d2 and d3 are the line spacings of the "回"-shaped delay line 21.

In some embodiments, the line spacing of the delay line 21 may be set to 100 μm-350 μm; that is, when the delay line 21 has the shape of the Chinese character "弓" shown in FIG. 3, distance d1 may be 100 μm-350 μm; and when the delay line 21 has the shape of the Chinese character "回" shown in FIG. 4, both distances d2 and d3 may be 100 μm-350 μm. Of course, the line spacing of the delay line 21 can be set according to a required thickness h of the liquid crystal cell.

In some embodiments, the distance between the first substrate and the second substrate, i.e., the cell thickness h of the liquid crystal cell may be 40 μm. Of course, the cell thickness may also be set according to parameters such as the line spacing and line width of the delay line 21. According to simulation experiments, when the cell thickness h of the liquid crystal cell is tens of microns, the insertion loss of the phase shifter is about 0.03 dB/mm-0.09 dB/mm. Compared with the related art, the response speed of the phase shifter in the embodiments of the present disclosure can be increased by 20-30 times.

In an example, the line spacing of the delay line is greater than 150 microns, and the line width of the delay line is 79 microns. In this case, the cell thickness h of the liquid crystal cell is only 40 μm, and the insertion loss of the phase shifter is about 0.03 dB/mm-0.09 dB/mm. Compared with the related art, the response speed of the phase shifter in the embodiments of the present disclosure can be increased by 20-30 times.

Figure 5:
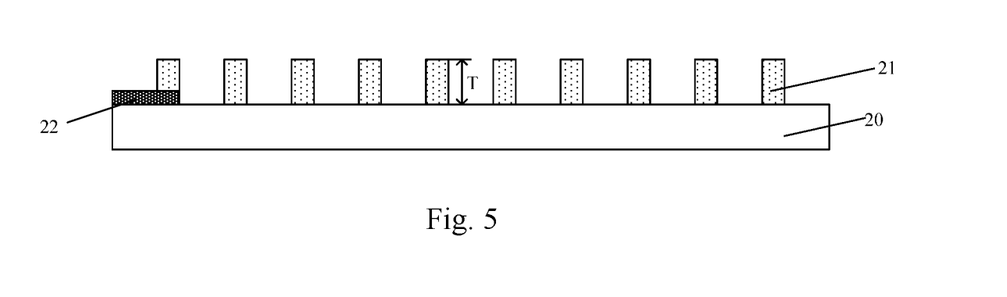
FIG. 5 is a cross-sectional view of a second substrate of a phase shifter according to an embodiment of the present disclosure.

In some embodiments, as shown in FIG. 5, the line width of the delay line 21 may be 40 μm-90 μm, and a thickness T of the delay line 21 may be 0.1 μm-100 μm. Of course, the line width and thickness T of the delay line 21 may be set according to the cell thickness h of the liquid crystal cell.

In some embodiments, the delay line 21 is made of, but is not limited to, a metal such as aluminum, silver, gold, chromium, molybdenum, nickel, or iron.

In some embodiments, a conductivity of a bias line is less than 14500000 siemens/m, and it is better to select the bias line with a lower conductivity value according to a size of the phase shifter.

In some embodiments, the bias line is made of, but is not limited to, indium tin oxide (ITO), nickel (Ni), tantalum nitride (TaN), chromium (Cr), indium oxide (In$_2$O$_3$), or tin oxide (Sn$_2$O$_3$). Preferably, the bias line is made of ITO.

Figure 6:
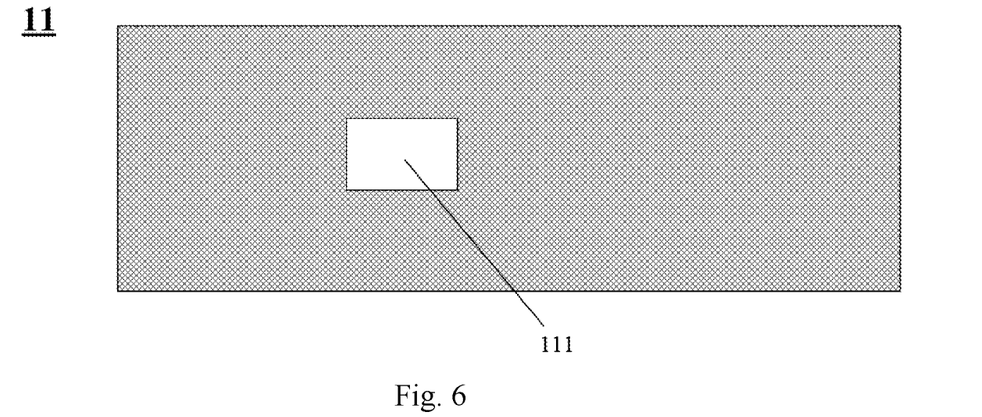
FIG. 6 is a top view of a ground electrode of a phase shifter according to an embodiment of the present disclosure.

In some embodiments, as shown in FIG. 6, the ground electrode 11 includes, but is not limited to, a planar electrode, and is made of, but is not limited to, aluminum, silver, gold, chromium, molybdenum, nickel, or iron. In order to enable an external microwave signal to be fed into the liquid crystal layer 30 of the phase shifter, the ground electrode 11 is provided with at least one opening 111.

In some embodiments, as shown in FIG. 1, a first alignment layer 12 is provided on a side of the ground electrode 11 facing the liquid crystal layer 30, and a second alignment layer 23 is provided on a side of the delay line 21 facing the liquid crystal layer 30. The first alignment layer 12 and the second alignment layer 23 determine an initial pretilt angle of the liquid crystal molecules in the liquid crystal layer 30.

In some embodiments, as shown in FIG. 1, the first base substrate 10 and the second base substrate 20 may be a glass substrate with a thickness of 100 μm-1000 μm, or a sapphire substrate, Alternatively, the first base substrate 10 and the second base substrate 20 may be a polyethylene terephthalate substrate, triallyl cyanurate substrate, or polyimide transparent flexible substrate with a thickness of 10 μm-500 μm. Specifically, the first base substrate 10 and the second base substrate 20 may be formed of high-purity quartz glass with extremely low dielectric loss. Compared with an ordinary glass substrate, the use of quartz glass for the first base substrate 10 and the second base substrate 20 can effectively reduce a loss of a microwave, and thus the phase shifter has a low power consumption and a high signal-to-noise ratio.

In some embodiments, as shown in FIG. 1, the liquid crystal molecules in the liquid crystal layer 30 are positive liquid crystal molecules or negative liquid crystal molecules. It should be noted that in specific embodiments of the present disclosure, an angle between a long axis direction of the liquid crystal molecules and the second base substrate 20 is greater than 0 degrees, and less than or equal to 45 degrees when the liquid crystal molecules are the positive liquid crystal molecules, and the angle between the long axis direction of the liquid crystal molecules and the second base substrate 20 is greater than 45 degrees and less than 90 degrees when the liquid crystal molecules are the negative liquid crystal molecules, which ensure that the deflection of the liquid crystal molecules causes the dielectric constant of the liquid crystal layer 30 to change, thereby achieving the purpose of phase shifting.

Of course, the phase shifter in the embodiments of the present disclosure not only includes the above-mentioned components, but also includes the supporting pillar 40 located on a side of the second alignment layer 23 facing the liquid crystal layer 30 to maintain the cell thickness of the liquid crystal cell formed by the first substrate and the second substrate. Moreover, frame sealing glue 50 is also provided between the first substrate and the second substrate for sealing the liquid crystal cell.

In the second aspect, embodiments of the present disclosure also provide a manufacturing method for a phase shifter, which can be used to manufacture the above-mentioned phase shifter. The method includes steps of forming a first substrate and a second substrate, and forming a liquid crystal layer 30 between the first substrate and the second substrate. The step of forming the first substrate includes: forming a pattern including a ground electrode 11 on a first base substrate 10; the step of forming the second substrate includes: forming a pattern including a delay line 21 and a bias line on a second base substrate 20; and a line spacing and/or line width of the formed delay line 21 is enable to make a cell thickness h between the first substrate and the second substrate (i.e., a thickness of the liquid crystal layer) be 20 μm-75 μm. The line spacing of the delay line 21 refers to a shortest distance between two parts of the delay line 21 extending in a same direction. As shown in FIG. 3, points A and B are two points on the delay line 21 adjacent to each other in a normal direction, i.e., the point A is on the delay line 21 and a normal line has intersection points with other parts of the delay line 21, and the point B is the one closest to the point A among the intersection points; and the line spacing of the delay line 21 is the distance between the points A and B.

Figure 7:
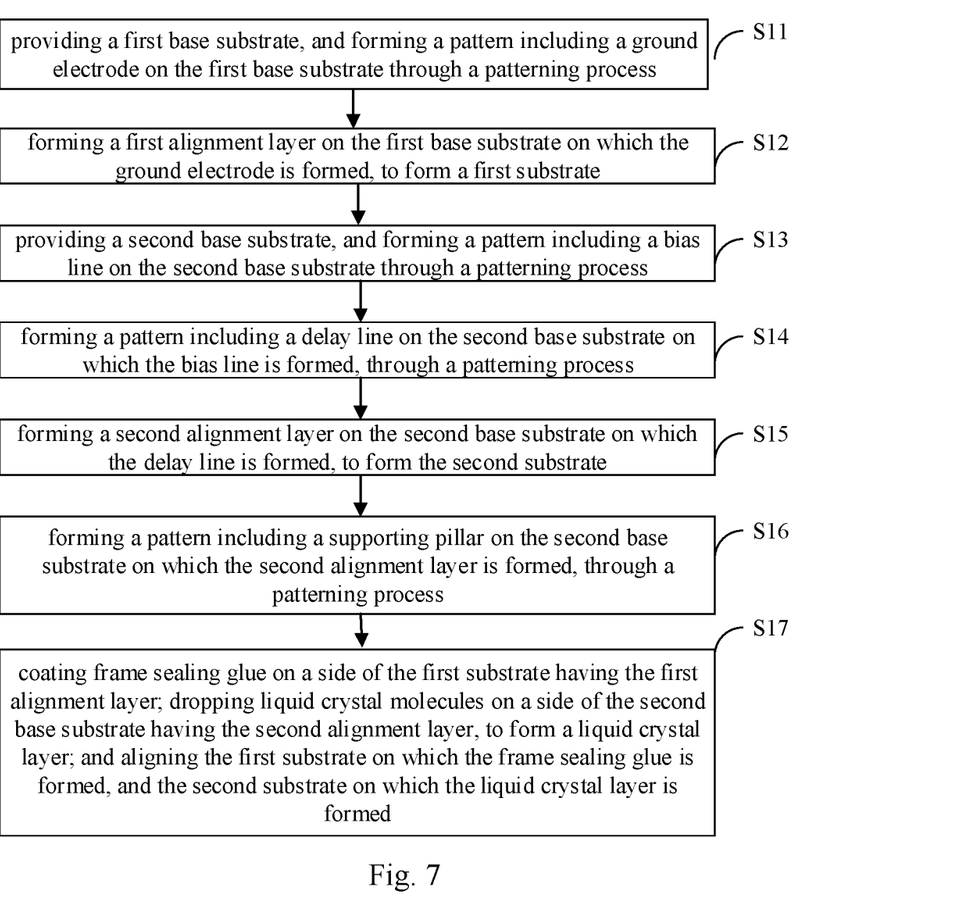
FIG. 7 is a flowchart of a manufacturing method for a phase shifter according to an embodiment of the present disclosure.

As shown in FIG. 7, the following provides an example of the manufacturing method for the phase shifter, so as to better understand the manufacturing method for the phase shifter in the embodiments of the present disclosure. It should be understood that the manufacturing method given below does not constitute a limitation on the protection scope of the embodiments of the present disclosure. There is no sequence for the preparation of the first substrate and the preparation of the second substrate. In the following description, the first substrate is preferably prepared as an example.

In step S11, a first base substrate 10 is provided, and a pattern including a ground electrode 11 is formed on the first base substrate 10 through a patterning process.

The first base substrate 10 may be a glass substrate, or a sapphire substrate; or a polyethylene terephthalate substrate, a triallyl cyanurate substrate, or a polyimide transparent flexible substrate may also be used. Specifically, the first base substrate 10 may be formed of high-purity quartz glass with extremely low dielectric loss. Compared with an ordinary glass substrate, the use of quartz glass for the first base substrate 10 can effectively reduce a loss of a microwave, and thus the phase shifter has a low power consumption and a high signal-to-noise ratio.

Specifically, step S11 may include: cleaning the first base substrate 10; forming a first metal material layer on the first base substrate 10 by a method including but not limited to a magnetron sputtering method; coating glue on a side of the first metal material layer away from the first base substrate 10 by spin coating or spraying; and then performing processes of pre-baking, exposure, development, post-baking, wet etching or dry etching in sequence, to form the pattern including the ground electrode 11.

In step S12, a first alignment layer 12 is formed on the first base substrate 10 on which the ground electrode 11 is formed, to form a first substrate.

Specifically, step S12 may include: printing an alignment liquid (i.e., a polyimide liquid, also called PI liquid) on the first base substrate 10 on which the ground electrode 11 is formed, heating to evaporate a solvent, and performing processes of thermal curing, rubbing or a photo-alignment to form the first alignment layer 12, and then a preparation of the first substrate is completed.

In step S13, a second base substrate 20 is provided, and a pattern including a bias line is formed on the second base substrate 20 through a patterning process.

The second base substrate 20 may be made of the same material as the first base substrate 10, and thus the description will not be repeated here. The bias line may be made of a material with a relatively low conductivity, such as ITO. In the embodiments of the present disclosure, ITO is taken as an example for description.

Specifically, step S13 may include: cleaning the second base substrate 20; forming an ITO material layer by a method including but not limited to a magnetron sputtering method; coating glue on the ITO material layer by spin coating or spraying; and then performing processes of pre-baking, exposure, development, post-baking, wet etching or dry etching in sequence, to form the pattern including the bias line.

In step S14, a pattern including a delay line 21 is formed on the second base substrate 20 on which the bias line is formed, through a patterning process.

Specifically, step S14 may include: forming a second metal material layer on a layer where the bias line is located by a method including but not limited to a magnetron sputtering method; coating glue on a side of the second metal material layer away from the second base substrate 20 by spin coating or spraying; and then performing processes of pre-baking, exposure, development, post-baking, wet etching or dry etching in sequence, to form the pattern including the delay line 21.

The material of the second metal material layer may be the same as that of the first metal material layer, and thus the description will not be repeated here.

In step S15, a second alignment layer 23 is formed on the second base substrate 20 on which the delay line 21 is formed, to form the second substrate.

Specifically, step S15 may include: printing PI liquid on the second base substrate 20 on which the delay line 21 is formed, heating to evaporate a solvent, and performing processes of thermal curing, rubbing or a photo-alignment to form the second alignment layer 23, and then a preparation of the second substrate is completed.

In step S16, a pattern including a supporting pillar 40 is formed on the second base substrate 20 on which the second alignment layer 23 is formed, through a patterning process.

Specifically, step S16 may include: coating glue on the second base substrate 20 on which the second alignment layer 23 is formed by spin coating or spraying; and then performing processes of pre-baking, exposure, development, post-baking, wet etching or dry etching in sequence, to form the pattern including the supporting pillar 40.

In step S17, frame sealing glue 50 is coated on a side of the first substrate having the first alignment layer 12; liquid crystal molecules are dropped on a side of the second base substrate 20 having the second alignment layer 23, to form the liquid crystal layer 30; and the first substrate on which the frame sealing glue 50 is formed, and the second substrate on which the liquid crystal layer 30 is formed are aligned.

Specifically, step S17 may include: coating the frame sealing glue 50 on the side of the first substrate having the first alignment layer 12; dropping the liquid crystal molecules on the side of the second base substrate 20 having the second alignment layer 23, to form the liquid crystal layer 30; and transferring the first substrate and the second substrate to a vacuum cavity for aligning, vacuum pressing, ultraviolet (UV) curing, and thermal curing to form a liquid crystal cell. In step S17, a vacuum filling (VIF) process may also be used to form the liquid crystal cell. Specifically, the first substrate and the second substrate are vacuum cell aligned, cut, heated and vacuumed to remove water vapor, vacuum-filled, and sealed by the frame sealing glue 50; and finally, the frame sealing glue 50 is cured by UV and heat.

So far, the preparation of the phase shifter in the embodiments of the present disclosure is completed. Of course, the above steps are not all the steps for preparing the phase shifter, and the preparation of the phase shifter may further include a step of binding a Flexible Printed Circuit (FPC) and the liquid crystal cell after forming the liquid crystal cell of the phase shifter.

Figure 8:
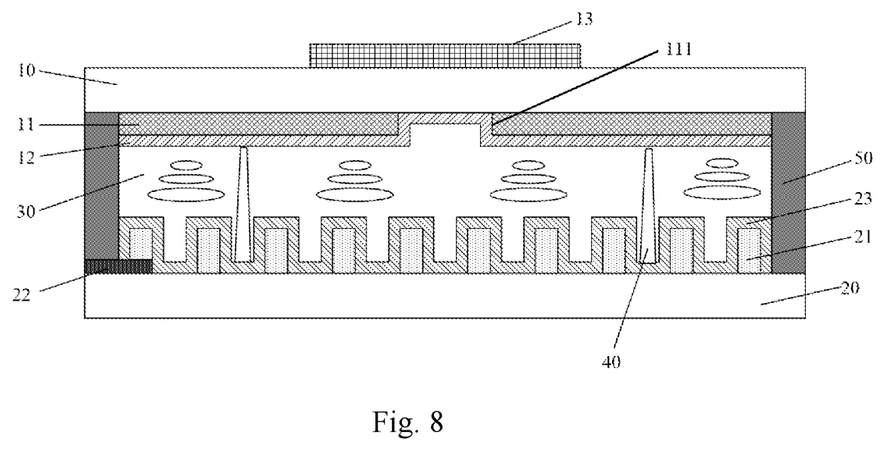
FIG. 8 is a schematic structural diagram of an antenna according to an embodiment of the present disclosure.

In the third aspect, as shown in FIG. 8, an antenna is provided according to the embodiments of the present disclosure. The antenna includes, but is not limited to, a receiving antenna. In the embodiments of the present disclosure, the receiving antenna is taken as an example for description. The antenna includes the above-mentioned phase shifter, and a patch electrode 13 arranged on a side of the first base substrate 10 away from the ground electrode 11; and an opening 111 is provided on the ground electrode 11 at a position corresponding to the patch electrode 13. The patch electrode 13 is used for feeding a microwave signal into the liquid crystal layer 30 of the phase shifter through the opening 111 of the ground electrode 11.

Since the antenna in the embodiments of the present disclosure includes the above-mentioned phase shifter, the line width and the line spacing of the conductive delay line 21 are set to make the phase shifter reach working status of impedance matching, less reflection, less loss, and reduced mutual coupling between various parts of the delay line 21. Therefore, the cell thickness h between the first substrate and the second substrate (i.e., the thickness of the liquid crystal layer) may be set to 20 μm-75 μm, so that a response speed of the phase shifter can be improved, and the performance of the antenna may be better.

It can be understood that the above implementations are merely exemplary implementations used to illustrate the principle of the present disclosure, but the present disclosure is not limited thereto. For those of ordinary skill in the art, various modifications and improvements can be made without departing from the spirit and essence of the present disclosure, and these modifications and improvements also fall within the protection scope of the present disclosure.

The invention claimed is:

1. A phase shifter, comprising:
   a first substrate and a second substrate arranged opposite each other, and
   a medium layer arranged between the first substrate and the second substrate,
   the first substrate comprising: a first base substrate, and a reference electrode arranged on a side of the first base substrate facing the medium layer; and
   the second substrate comprising: a second base substrate, and a delay line arranged on a side of the second base substrate facing the medium layer,
   wherein an orthographic projection of the delay line on the first base substrate at least partially overlapping with the reference electrode on the first base substrate, and
   a line spacing and/or a line width of the delay line is enable to make a cell thickness between the first substrate and the second substrate be 20 μm-75 μm.

2. The phase shifter of claim 1, wherein the line spacing of the delay line is 100 μm-350 μm.

3. The phase shifter of claim 2, wherein the side of the second base substrate facing the medium layer is further provided with a bias line; and the bias line is coupled with the delay line.

4. The phase shifter of claim 2, wherein the delay line is any one of a shape of the Chinese character "弓", a shape of the Chinese character "回", and a serpentine shape.

5. The phase shifter of claim 1, wherein the cell thickness between the first substrate and the second substrate is 40 μm.

6. The phase shifter of claim 1, wherein the side of the second base substrate facing the medium layer is further provided with a bias line; and the bias line is coupled with the delay line.

7. The phase shifter of claim 6, wherein the bias line has a line width of 2 μm-8 μm.

8. The phase shifter of claim 6, wherein the bias line is made of any one of indium tin oxide, nickel, tantalum nitride, chromium, indium oxide, and tin oxide.

9. The phase shifter of claim 1, wherein the delay line is any one of a shape of the Chinese character "弓", a shape of the Chinese character "回", and a serpentine shape.

10. The phase shifter of claim 1, wherein the delay line is made of any one or more of aluminum, silver, gold, chromium, molybdenum, nickel, and iron.

11. The phase shifter of claim 1, wherein the reference electrode comprises a planar electrode, and the planar electrode is provided with at least one opening.

12. The phase shifter of claim 1, wherein the first substrate further comprises a first alignment layer arranged on a side of the reference electrode facing the medium layer; and the second substrate further comprises a second alignment layer arranged on a side of the delay line facing the medium layer.

13. The phase shifter of claim 1, further comprising a supporting pillar located between the first substrate and the second substrate for maintaining the cell thickness between the first substrate and the second substrate, and frame sealing glue for sealing the first substrate and the second substrate.

14. The phase shifter of claim 1, wherein the reference electrode comprises a ground electrode.

15. The phase shifter of claim 1, wherein the medium layer comprises a liquid crystal layer.

16. The phase shifter of claim 1, wherein the line width of the delay line is 40 μm-90 μm.

17. The phase shifter of claim 16, wherein the line width of the delay line is 79 μm.

18. An antenna comprising the phase shifter of claim 1.

19. The antenna of claim 18, wherein the reference electrode is provided with an opening, the antenna further comprises a patch electrode arranged on a side of the first base substrate away from the liquid crystal layer, and the patch electrode is arranged to correspond to a position of the opening of the reference electrode.

20. A manufacturing method for a phase shifter, comprising: forming a first substrate and a second substrate, and forming a medium layer between the first substrate and the second substrate; wherein     forming the first substrate comprises: forming a pattern comprising a reference electrode on a first base substrate;

forming the second substrate comprises: forming a pattern comprising a delay line on a second base substrate; and     a line spacing and/or a line width of the delay line is enable to make a cell thickness between the first substrate and the second substrate be 20 μm-75 μm.

\* \* \* \* \*